3,814,815
METHOD OF MANUFACTURING GUM BASES
Juzo Hashimoto, Hirakata, Hisashi Kawamoto, Takatsuki, Isao Kanbara, Moriguchi, Akira Inoue, Ikeda, and Akira Kitajima, Takatsuki, Japan, assignors to The Ezaki Glico Kabushiki Kaisha, Osaka, Japan
No Drawing. Filed May 8, 1972, Ser. No. 251,426
Claims priority, application Japan, Oct. 22, 1971, 46/84,110, 46/84,111
Int. Cl. A23g 3/30
U.S. Cl. 426—3                      11 Claims

ABSTRACT OF THE DISCLOSURE

Chewing gum base in which a gluten is denaturated by more than 10% and method thereof.

BACKGROUND OF THE INVENTION

This invention relates to methods of manufacturing base gum of chewing gums (hereinafter referred to as "gum base").

There are a variety of chewing gums (hereinafter referred to as "gum") available on the market, in which gluten is used as the gum base. (See for example Japanese Patent Publication No. 13,701/1962 and U.S. Patent 2,469,861.) Such gums are popular because the gum base has excellent properties, as compared with those in which other gum bases are used, such as polyvinyl acetate, chicle rubber, etc. Advantageously, these gums are edible natural products. Also, because they are protein, they are not harmful to the human body should they be swallowed. To the contrary, these gums would be nutritious.

These prior art gums, however, have the following disadvantages. Gluten has too low a viscoelasticity and gums made therefrom are too soft to be chewed agreeably. Also, a particular amount of moisture is necessary to form gum in sheet shape. If the required amount of water were mixed in without modification, other water soluble materials (for example, sugar, glucose, etc.) contained in the gum would be extracted by this water, and subsequently, it would be difficult to obtain satisfactory gum. Various other drawbacks exist in prior art gums.

SUMMARY OF THE INVENTION

An object of this invention is to provide a chewing gum base which is free from the aforementioned disadvantages and deficiencies, and to produce gums therefrom in commercial quantities with ease, despite the presence of gluten in the gum.

Briefly this invention encompasses a gum base of gluten denaturated more than 10% and a method of manufacturing same.

DETAILED DESCRIPTION OF THE PREFERRED EMBODIMENTS

Gluten which is denaturated more than 10% (by weight, and the same applies herein) is used as the raw material. The method of measuring the denaturation will be described further in detail hereinbelow. Gum base denaturated more than 10% and up to about 60% are especially preferred. The higher the percentage over about 60%, the smaller the viscoelasticity tends to become. Gum bases denaturated less than 10% have viscoelasticity that is so low that they cannot be employed for present purposes. Accordingly, denaturation outside of the mentioned range of from 10% to 60% would not be generally acceptable.

Although the general method of obtaining glutens denaturated more than 10% is arbitrary, and falls outside the scope of the invention, the particular specifics thereof have special applicability. One method which may be used, is to first, prepare glutens which are denaturated less than 10%. Such glutens may include wet gluten, vital gluten powder, etc. The glutens are heated by an ordinary method. An advantageous way to commercially achieve this end is to prepare a homogeneous mixture system comprising 100 parts (by weight, the same applying herein) of gluten (solid ingredient) and more than about 100 parts of water, and then, to heat the system. The heating may be stopped when the gluten is denaturated to the desired degree. The product obtained in this manner is scoured with water, if required, to remove the soluble matters therefrom. Then, the product is dehydrated to produce the material gluten (in powder form). If required the product obtained from this process may be dried by an ordinary method.

An especially suitable material gluten for this inventive purpose may be obtained in the following way. A homogeneous mixture system of glutens denaturated by more than 10% and water is prepared. The amount of water may preferably be more than about 70 parts in proportion to 100 parts of gluten associated therewith. This mixture is frozen by an ordinary method. The freezing period may be arbitrarily set. In this way, the material gluten is obtained. If required, the product may be dried.

Subsequently, this material gluten, if dried thoroughly, may be wetted. The water content may be more than about 15 parts to 100 parts of the material gluten associated therewith, and particularly preferably, a range of 18 to 27 parts.

It is recommended to have water and glycerine held in this system by wetting the gluten. For the entire system mixture, an acceptable range for water runs above about 10 parts, preferably 13 to 22 parts; and for glycerine an acceptable range is above about 10 parts, and preferably 20 to 25 parts. Particularly favorable results are obtained by first mixing both of them together before adding the mixture to the system. If the water and glycerine used are outside of the range specified, the gum bases tend to become too soft for use, and too low in viscoelasticity.

Thereafter, these material glutens which are denaturated more than 10% and an ordinary material for gum base are homogeneously mixed together.

The ordinary materials for gum base include, for example, natural rubber, chicle rubber, polyvinyl acetate, etc., undenaturated gluten, undenaturated soy protein, milk casein, etc. At this time, the denaturated material gluten should be used in an amount in excess of one half of the total amount of this mixture system. The mixing or homogenization may be carried out by an ordinary method.

The product obtained in the foregoing way is the desired gum base. To this gum base, other materials for gums such as sugar, spices, flavorings, nutrients, etc., are added by an ordinary method. Thus, the entire mixture is homogenized, thereby forming gums having high quality.

Measuring ratio of denaturation of glutens

The glutens, with an addition of N/10 acetic acid, is shaken for 8 hours at a constant temperature of 27° C., to extract the soluble ingredients (being namely undenaturated gluten). Then, the insoluble ingredients (being denaturated gluten) is removed by centrifugation. The amount of nitrogen in the solution is calculated by the Micro-Kjeldahl method, and is converted into the amount of nitrogen (X) per solid matter in the test specimen. At the same time, the amount of nitrogen soluble in N/10 acetic acid of the undenaturated gluten is determined by a similar method. Since the amount of nitrogen soluble in N/10 acetic acid of completely denaturated gluten is zero, the ratio of denaturation is equal to $$\left(1 - \frac{X}{X_0}\right) \times 100.$$

The resulting gum base, advantageously, has high plasticity, and the final gum product manuactured therefrom is very chewy. Such desirable effects are believed to be derived from the fact that, because the gluten is partially denaturated, its water-retention properties is reduced, and its viscoelasticity is diminished. Consequently, the gluten becomes plastic.

When the glycerine, to which water is added beforehand, is added, water soluble materials in the gum base (for example sheet gum) are not dissolved out. Accordingly, the manufacturing process may be run with ease, and the gum obtained therefrom has a high commercial value. As compared with other methods where glycerine is not used, the amount of water used may be reduced. Glycerine has water-retention properties.

The effects of the addition of water retainers is illustrated in Table 1 hereinbelow.

TABLE 1.—COMPARISON TESTS WITH VARIOUS WATER RETAINERS

| | Tests Nos. | | | | | |
|---|---|---|---|---|---|---|
| | 1 | 2 | 3 | 4 | 5 | 6 |
| Materials: | | | | | | |
| Gluten (denaturated 40%) | 20 | 20 | 20 | 20 | 20 | 20 |
| Glycerine | 6 | | | | 9 | |
| Alcohol | | | 6 | | | 9 |
| Propylene glycol | | | | 6 | | 9 |
| Water | 3 | 3 | 3 | | | |
| Formability | Z | XX | Y | XX | XX | X |

NOTES:
(1) The numbers provide the parts by weight.
(2) The following legends are used to measure formability:
　Z—Homogeneously mixable with sugar and other materials. Does not segregate itself. Readily formed.
　Y—Rather difficult to form.
　X—Barely formable.
　XX—Utterly unformable. Has no coherence.

The products obtained after undergoing freezing process are superior in texture, etc. to those not subjected to such process. This is illustrated by the Table 2 below. The exact reason for these differences are not yet completely understood. However, such differences do exist.

TABLE 2

| | Texture | Diameter of Foam |
|---|---|---|
| Those subjected to freezing process. | Fine | Homogeneous, very minute. |
| Those not subjected to freezing process. | Coarse | Heterogeneous, coarse and large. |

In the following description, different applications of this invention are illustrated with examples.

EXAMPLE 1

|  | Grams |
|---|---|
| Dry denaturated gluten (denaturated 25%) | 20 |
| Powder sugar | 20 |
| Glycerine containing water [1] | 8 |
| Flavorings, an appropriate amount. | |

[1] Denotes a mixture of two parts glycerine and 1 part water added thereto.

The dry denaturated gluten, which was pulverized, was homogeneously mixed with powdery sugar. The mixture was, then, kneaded with glycerine containing water and flavorings. Thereafter, a gum was formed by a conventional manufacturing method.

The product was highly chewy.

EXAMPLE 2

150 parts of powdery vital gluten and 45 parts of powdery sugar were homogeneously mixed. To this mixture, 150 to 250 parts of water were then added. The material prepared was denaturated 20% by heating at 65° C. for 30 minutes. Thereafter, flavoring was added. In this way, a gum base which was edible and possessed good viscoelasticity was obtained.

By using this gum base, a gum was manufactured by a conventional method. The workability was high, because the base did not run flabbbily during the manufacturing process.

The gum obtained thereby was very chewy, durable and highly flavor retentive.

EXAMPLE 3

A denaturated gluten (denaturated by 40%) was held all day long under vacuum of −750 mm. Hg (gauge pressure) and at a temperature of −35° C. to freeze. Thereafter, it was gradually heated up to a temperature of 30° C. in about 20 hours and dried. The moisture of the dried product was about 0.5%.

To 20 grams of this material, 10 grams of completely denaturated gluten, 40 grams of powdery sugar, 16 grams of glycerine containing water (34 weight percent moisture) and an appropriate amount of flavorings were added. These ingredients were homogeneously mixed into the gum base. The material thus produced was very chewy.

EXAMPLE 4

150 grams of vital gluten (denaturated 5%) and 45 grams of powdery sugar were mixed. This powdery mixture, with 200 grams of water added, underwent a thermal denaturation (to a ratio of denaturation of 30%). This material was then frozen dried, and flavored under similar conditions of Example 3.

The product obtained was a gum, very porous with very small foam diameter. This gum was cut into 2 cm. square.

This product was agreeable in chewing. A chewed chunk readily coalesced into gummy texture, and the gum has some novel texture.

The foregoing description is intended to be illustrative of the principles of the invention. Numerous modifications and variations thereof would be apparent to the worker skilled in the art. All such modifications and variations are to be considered to be within the spirit and scope of the invention.

What is claimed is:

1. Chewing gum base comprising a gluten denaturated by between more than 10% by weight and 60% by weight in an amount of more than one half of the total weight of said chewing gum base.

2. Chewing gum base of claim 1, wherein said gluten has a water content of more than 15 parts to 100 parts of said gluten.

3. Chewing gum base of claim 2 wherein said water content is within the range of from 18 to 27 parts by weight.

4. Chewing gum base of claim 1, wherein said gluten has a water content over 10 parts by weight and glycerine of content over 10 parts by weight.

5. Chewing gum base of claim 4, wherein said water content is between 13 to 22 parts by weight, and said glycerine content is between 20 to 25 parts by weight.

6. Chewing gum base of claim 1, further comprising natural rubber, chicle rubber, polyvinyl acetate, undenaturated gluten, undenaturated soy protein, milk casein or mixtures thereof.

7. Method of manufacturing chewing gum base, comprising the steps of
   (A) denaturating gluten by between more than 10% by weight and 60% by weight;
   (B) wetting said denaturated gluten by adding to 100 parts by weight of gluten more than 15 parts by weight water or a mixture of above 10 parts by weight water and above 10 parts by weight of glycerine; and
   (C) homogeneously mixing said wetted gluten in an amount of more than one half of the total weight of said chewing gum base with ordinary material mixed with plasticizers in small quantities and selected from the group consisting of natural rubber, chicle rubber, polyvinyl acetate, undenaturated gluten, undenaturated soy protein, milk casein and mixtures thereof, to form a chewing gum base.

8. Method of claim 7, wherein said denaturating is done by homogeneously mixing 100 parts by weight gluten to 100 parts by weight water; heating said mixture, scouring the resulting gluten with water to remove soluble materials therefrom and dehydrating the remaining insoluble materials.

9. Method of claim 7, wherein said denaturating is done by mixing 70 parts by weight water to 100 parts by weight of gluten; freezing said mixture; and drying the resulting product.

10. Method of claim 7, wherein said wetting is done by adding water in the amount of 18 to 27 parts by weight.

11. Method of claim 7, wherein said wetting is done by adding a mixture of 13 to 22 parts by weight water and 20 to 25 parts by weight of glycerine.

References Cited
UNITED STATES PATENTS

| | | | |
|---|---|---|---|
| 2,586,675 | 2/1952 | Lutz | 99—135 |
| 2,203,436 | 6/1940 | Kertess | 99—135 |
| 2,946,780 | 7/1960 | Barker | 260—112 G UX |
| 3,409,440 | 11/1968 | Höhl | 260—112 G UX |
| 2,461,829 | 2/1949 | Lowen | 260—112 G |

A. LOUIS MONACELL, Primary Examiner

J. M. HUNTER, Assistant Examiner